United States Patent [19]

Rich

[11] 4,102,040
[45] Jul. 25, 1978

[54] METHOD OF MANUFACTURING A CURVED COMPONENT OF A MAGNETIC CIRCUIT

[75] Inventor: Bernard J. Rich, Issy-Les-Moulineaux, France

[73] Assignees: Societe Anonyme pour l'Equipement Electrique des Vehicules s.E.V. Marchal; S.E.V. Alternateurs, both of Issy-Les Moulineaux, France

[21] Appl. No.: 701,510

[22] Filed: Jul. 1, 1976

[30] Foreign Application Priority Data

Jul. 3, 1975 [FR] France .............................. 7520927
Feb. 17, 1976 [FR] France .............................. 7604317
Feb. 25, 1976 [FR] France .............................. 7605287

[51] Int. Cl.² ......................................... H02K 15/02
[52] U.S. Cl. ........................................ 29/598; 29/596; 29/605; 29/609; 72/166; 310/42; 310/216
[58] Field of Search ................ 29/596, 598, 609, 605; 310/42, 216, 217, 218; 72/133, 166

[56] References Cited

U.S. PATENT DOCUMENTS

| 2,294,322 | 8/1942 | Von Der Woude ......... 310/216 NX |
| 2,712,084 | 6/1955 | Bridenbaugh ....................... 310/216 |
| 3,043,971 | 7/1962 | Stevens .............................. 29/609 X |
| 3,260,875 | 7/1966 | Evans .................................... 310/217 |
| 3,283,399 | 11/1966 | Hart et al. .......................... 29/609 X |
| 3,436,812 | 4/1969 | Aoki et al. ............................. 29/596 |
| 3,577,851 | 5/1971 | Detheridge et al. .................. 29/596 |

Primary Examiner—Carl E. Hall
Attorney, Agent, or Firm—Brisebois & Kruger

[57] ABSTRACT

Identical strips of magnetic metal having alternating slots and pole teeth along one edge are cut from sheet material in a pattern minimizing waste of metal, stacked, and bent into a cylinder or sector of a cylinder. The ends of the stacks are then fastened together to form a rotor or stator.

22 Claims, 20 Drawing Figures

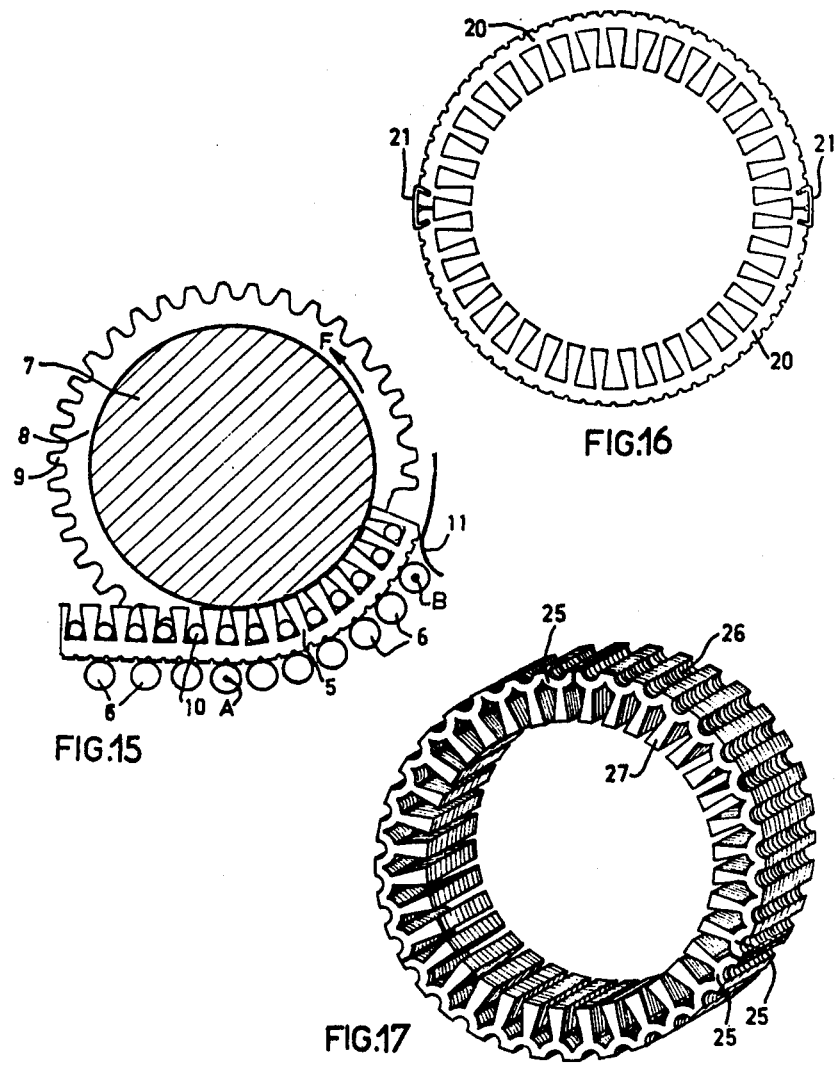

METHOD OF MANUFACTURING A CURVED COMPONENT OF A MAGNETIC CIRCUIT

SUMMARY OF THE INVENTION

The stators of rotating electrical machines, and especially alternators for automotive vehicles, are commonly made of a stack of plates, which stack has the general shape of a cylindrical ring and is provided on its internal cylindrical wall with slots defining pole cores therebetween. The same structure may be found in the rotors of rotating electrical machines. In order to manufacture annular stators or rotors of this type it has already been suggested that annular plates be cut to the shape of the stator or rotor and stacked one upon the other to produce the stator or rotor required. The operation of cutting out a ring necessarily involved the loss of a considerable amount of material during the cutting process because, beginning with the initial sheet, on the one hand, the central zone within the ring is lost, and on the other hand, a certain surface area around the outer edge of this ring is lost. This loss of material considerably increases the cost of manufacturing components made in this manner. In order to reduce the loss of material it has already been suggested that annular sectors be assembled together since the sectors may be cut without losing very much material. However, during the assembly of the stator or rotor it is necessary to assemble the sectors which have been cut in this manner together to form the complete rings and this assembly operation loses, because of the complexity involved, much of the advantage which resulted from decreasing the losses of material during cutting.

It has also been proposed, for example, in U.S. Pat. Nos. 1,920,154, 1,920,155, 1,920,354 and 1,970,536 to cut a continuous strip having a straight edge from a sheet, while the other edge of the strip is provided with slots forming a crenelation, said strip being subsequently wound helically to form the stator. The strips may be cut with a very small loss of material since it is possible to cut from a single rectangular sheet, two identical strips with the teeth separating two successive slots in one strip fitting into the slots in the other strip. However, the automatic helical winding of the crenelated strip presents a substantial difficulty because of the fact that the cores of one turn of the coil must be located exactly in alignment with the teeth of the preceding coil. The necessary winding machines are thus highly complex so that the cost of the stators is increased, on the one hand, by the amortization of the machines and on the other hand by the setting up, surveillance, and adjustment of the machine during the course of use.

It is the purpose of the present invention to provide a new method of manufacturing an annular stator or rotor for an electrical machine which process makes it possible, on the one hand, to avoid waste of material during cutting of the sheets from which the annular strips are made, which strips are stacked together to constitute the stator or rotor, and, on the other hand, to form the stator or rotor from such flat strips by means of simple operations which require only relatively inexpensive machinery.

The new process according to the invention also makes it possible to obtain annular stators or rotors at a low cost of manufacture.

It is a further purpose of the invention to provide a stator or rotor for a rotating electrical machine consisting of a stack of strips obtained in accordance with the process according to the invention. However, the present invention is not limited in its application to the manufacture of annular stators or rotors for rotating electrical machines and the purpose of the invention is, in a more general way, to provide a method of manufacturing a curved member of magnetic material for use in an electromagnetic device.

It is accordingly an object of the present invention to provide a new method of manufacturing a curved member made of magnetic material and constituting one part of an electromagnetic device, said process comprising the steps of cutting from a substantially flat sheet strips having two edges which are substantially parallel, said process being characterized by the fact that said strips have edges having substantially straight median lines, all the strips being identical. These strips are stacked in such a fashion that the median lines of the corresponding edges are superposed to obtain a stack of strips having the desired thickness to form the member to be manufactured. The stack of strips formed in this manner is curved to form a circular sector through an angle of at most equal to 360°, the axis of which sector is perpendicular to the planes of the stacked strips of sheet metal.

It is a further object of the invention to provide a curved member made from a stack of strips of magnetic material used in the manufacture of an electromagnetic device characterized by the fact that it is obtained by the above-described process.

The process according to the invention is particularly applicable to the case in which annular stators or rotors are being manufactured for rotary electrical machines. It is therefore still a further object of the invention to provide a new method of manufacture of the type described above in which the curved member utilized in the manufacture of an electromagnetic device is an annular stator or rotor for a rotating electrical machine, especially for the alternator of an automotive vehicle. The strips used in the manufacture of said member have one edge which comprises a succession of slots forming a crenelation, said slots defining teeth therebetween and characterized by the fact that, after having stacked the strips of cut-out sheet metal, the stacks of strips is bent into a circular sector extending through an angle $\alpha$ at most equal to 360°. If $\alpha$ is different from 360°, at least one other stack of curved strips is made in the same manner and curved to have the same radius, so as to constitute a circular sector having an angle of $360° - \alpha$, which may be connected to the first curved stack to form a circular stator or rotor having a regular succession of slots and poles. The ends of the stack or stacks of curved strips are fastened together face to face to form the stator or rotor desired.

In a preferred method of carrying out the process according to the invention, two strips for a single stack of strips to be bent are cut simultaneously so that the teeth of one of the strips fit into the slots in the other strip. In order to introduce the stack of strips into the bending device, spindles having a length greater than the thickness of the stack of strips are introduced into each of the slots of the plurality of slots in the stack of strips. Drive means cooperates with the ends of these spindles and preferably a spindle is introduced into each slot in the stack of strips, all the spindles being identical. Advantageously, the diameter of the spindles may be equal to the diameter of a circle which, in any slot of the finished stator or rotor, is tangent to the bottom of the slot and to the two lateral sides which define said slot. The driving means which cooperates with the spindles to bend the stack of strips is a wheel having the inner diameter of the annular stator or rotor to be manufactured, said wheel being gripped between two toothed cheek plates, the teeth of the two cheek plates being identical, positioned opposite each other, and having a pitch equal to the pitch of the slots in the stack of strips. A bending member consisting preferably of a series of rollers is positioned opposite the periphery of said wheel at a distance permitting the stack of strips to be curved to pass between the wheel and the bending device. One of the two toothed cheek plates is removable. The strips of the stack of curved strips are fastened to each other before bending. The strips of the stack of strips may be fastened together by welding them along one of the edges of the stack of strips. Recesses are provided in the strips before bending along the edge opposite the one which carries the slots. The recesses provided along the straight edge of the strips are semicircular in shape. The centers of the recesses provided in the straight edges of the strips are positioned directly opposite the slots and/or teeth formed in the other edge of the strip. A recess is positioned in alignment with each pole and the bottom of the slot has a depression in its central zone. The teeth have, at least in their central zone, a trapezoidal shape. The recesses have a semi-circular shape and the bottom of the slots are defined by two semi-circular arcs having the same radius, the centers of which coincide substantially with the centers of the recesses adjacent to the slot in question.

After bending, the stack of bent strips is subjected to the action of a press acting parallel to the axis of bending. The ends of the stack or stacks of bent strips intended to form the stator or rotor are welded together, preferably with welding metal added, or fastened together mechanically, or held together in an outer jacket. A male protuberance cooperating with a corresponding recess adapted to assure the relative radial position of adjacent ends may be advantageously provided in the junction zone of two ends of a curved stack. When the ends are connected by means of a mechanical fastener, one may use a staple or inter-engaging teeth on the ends of the stacks of curved strips to be assembled. When the mechanical fastener is a staple, the staple utilized is preferably positioned parallel to the axis of the stator or rotor to be manufactured and may advantageously have a dove-tailed section with the arms of the staple penetrating into slots formed during cutting of the strips which are to constitute the stack of strips to be curved. When the mechanical fastener utilizes interfitting teeth, the teeth may advantageously be formed by appropriately cutting the ends of the strips which are to form the stacks of strips to be curved. The bearing surfaces of the fastening teeth may be positioned in a radial plane of the stator or rotor or may be oblique with respect to the radial plane of the stator which passes through the teeth in question. The strips of the stack of strips are fastened to each other at at least one place other than the one at which the two ends of the stack of strips are fastened together. This additional attachment of the strips of the stack of strips is formed by welding along one of the edges of the stack of strips. Alternatively, the additional attachment of the strips in the stack may be carried out by riveting.

When the angle $\alpha$ is less than 360°, the process according to the invention is formed into a stator or rotor by assembly of several stacks of curved strips, each corresponding to a circular sector, and subtending, for example, the same central angle. The assembly of a stator or rotor may, in particular, be made from two, three or four stacks of identical curved strips.

When the angle $\alpha$ is equal to 360°, the process according to the invention produces a rotor or stator from a single stack of curved strips. The radius of the bending circle of the stack of strips is then such that, after the curving, the two ends of the strips face each other. At least one of the ends of the stack of strips may advantageously be subjected to a precurving process before the entry of the stack into the curving machine. At the end of the bending operation, the spindles in the two end slots of the stack of curved strips are fastened together, for example, by means of at least one connector positioned on at least one of the ends of the spindles in the end slots. Each lateral cheek plate of the bending wheel is hollowed out in alignment with said connector to permit it to pass through during removal of the cheek plate. Preferably the spindles in the end slots of the stack of strips are fastened together by positioning the connector at each end of the spindles. If a bending member is used to produce the curvature, said bending member advantageously consists of a series of bending rollers and if the edge of the stack of strips to be bent which bears against such bending rollers has regularly distributed recesses therein, the bending rollers are positioned at a first angular pitch with respect to the angular pitch of the recesses.

It has already been indicated that a supplemental fastening together of the strips of the stack of curved strips may be carried out in a zone other than the one at the ends of the stack of strips. In a first method of carrying out the process according to the invention, this supplemental attachment occurs after bending of the stack of strips to assure cohesion of the curved stack and permit easier handling thereof. However, in this case, during curvature, the strips of the stack of strips are not connected to each other, which constitutes a difficulty in carrying out the process according to the invention. Contrary to what one might think, it is not absolutely necessary to permit, during curvature, relative movement of the strips of the stack of strips with respect to each other. It has, in fact, been found, in a surprising way, that the strips of the stack of strips to be curved may be fastened together, for example, by suitable welding, substantially perpendicular to the plane of the strips of the stack of plates, before proceeding with the bending operation, without producing any disadvantage during the bending operation. In a second method of carrying out the process according to the invention, one thus fastens the strips of the stack of strips together before the stack is curved. This is quite advantageous because the handling of the stack of strips to be curved and its location on the bending machine are considerably facilitated.

It is a further object of the present invention to provide, as a new article of manufacture, a stator or rotor for a rotating electrical machine, and in particular a stator for an alternator of an automotive vehicle produced in accordance with the process hereinbefore described. This stator or rotor is formed from a stack of sheets of magnetic material and constitutes a cylindrical ring. The ring comprises, on one of its cylindrical surfaces, slots which are regularly spaced from each other by teeth, characterized by the fact that it comprises $n$ substantially radial assembly zones, in each of which are positioned the adjacent ends of at least one curved stack of identical strips superposed upon each other, the said curved stacks forming part of $n$ curved stacks, the assembly of which permits the formation of a complete cylindrical ring which constitutes the stator or rotor, $n$ being a whole number equal to or greater than 1.

In a preferred embodiment of the invention, a connection between two adjacent ends is made in each assembly zone. The connection is made by welding. In a particular variation the ends are connected by mechanical fasteners, for example, by means of at least one staple or interfitting teeth provided at the adjacent ends to be connected. When a staple is used, the staple is positioned on the side of the rotor or stator which does not have the slots and teeth. The fastener is a staple having a dove-tailed section, with the arms of the staple penetrating into slots provided in the adjacent ends to be assembled. When the connection is made by welding, the welding is carried out with welding metal added over the entire radial thickness of the stator or rotor in the connecting zone. The cylindrical wall of a stack of curved strips which does not have the slots and teeth is provided with recesses positioned substantially parallel to the generatrices of the cylindrical ring, whether partial or not, which constitutes each curved stack, the directrix of the right cylinder which constitutes the wall in question being a polygon, the corners of which are in alignment with the axes of said recesses. The recesses are semi-circular in section. The recesses are positioned in the radial median plane of the slots and/or the poles of the stack of curved strips. A recess is provided in alignment with each pole. The bottom of the slots has a depression in its central zone. The right section of the bottom of the slots consists of two arcs of a circle having the same radius and having as their axes the axes of the channels adjacent to the slots in question. The strips of a curved stack are fastened together parallel to the generatrices of the cylindrical ring constituted by said curved stack. The strips of a stack of curved strips are attached together by welding along at least one of the cylindrical walls of the curved stacks. In a variation the strips of a curved stack are riveted together.

It has, surprisingly, been found that when one or more gaps occur between the stacks of curved strips which are assembled to form the stator or rotor according to the invention, the electromagnetic characteristics of the stator or rotor are not significantly affected.

When the stack of curved strips is intended to constitute the stator of an alternator, it has been indicated that one may provide, on the strips, before bending, along the edge remote from the one which carries the slots in the form of a crenelation, recesses of small dimensions adapted to facilitate bending. Certain of these bending recesses may advantageously be enlarged and used to receive tie rods for assembling the alternator, that is to say, the tie rods which fasten the stator to the cheek plates in front and in back of the alternator. It has also been suggested that the recesses thus formed in the edge of the strips of sheet metal which do not carry the slots be enlarged in a systematic manner so that the stack of curved sheets comprises a substantial number of large recesses parallel to the axis of the cylinder which said stack of curved sheets constitute. Under these conditions, if the stack of curved sheets is utilized as the stator of the alternator, channels permitting the passage of air exist on the surface of the stack which comprises said recesses, since only certain of the recesses are filled by the assembling tie rods and a plurality of supplemental recesses are left empty. This possibility of sweeping the border, which has no polar teeth, with a cooling fluid flow, makes it possible, in the case of the rotor or stator, to considerably improve the cooling of the rotating machine and consequently its properties.

In accordance with an interesting property, a stator or rotor for an alternator according to the invention is thus characterized by the fact that, on its outer surface, it has a plurality of recesses constituting cooling channels. Advantageously these channels are regularly distributed along the surface of the stator or rotor. A cooling channel may be positioned in alignment with each of the poles. The axes of the cooling channels may advantageously be positioned at the intersections of the radial median planes of the poles and of the surface of the stack of strips which does not carry the slots forming a crenelation.

If the strips have at least one recess cut therein on the slot-free surface, the section through which the magnetic flux passes is locally diminished as compared to the adjacent sections through which the flux passes. It has been surprisingly found that this decrease in that section results in practically no decrease in the properties of the rotating machine utilizing the stator or rotor made in this manner even if the number of recesses becomes relatively high.

It has accordingly been deduced that the residual section remaining in alignment with these recesses is sufficient and that it is possible to decrease the sections through which the flux passes in the zones having no recesses so as to bring this section down to the same size as that in those zones comprising a recess. When a recess is provided in alignment with each pole, the bottom of the slot has therefore been formed so as to maintain the section through which the magnetic flux passes between the poles of the stator or rotor substantially constant.

It will thus be seen that a lightened rotor or stator is provided which has a flux path having a substantially constant section and comprises, on the slot-free surface of the stack of curved strips, parallel channels which may be used for cooling.

It has also been found that it is preferable to cut the strips which are to form the stacks of strips to be curved so that the substantially straight edges of these strips are perpendicular to the direction in which the plates from which strips are cut were rolled. In effect, in accordance with this arrangement, the metal fibers which are oriented in the rolling direction are substantially parallel to the axis of the poles and the stack of sheets is easier to bend into a curve. The process according to the invention may thus advantageously be characterized by the fact that the strips of a stack of strips to be curved are cut from a rolled plate, the slotted edges of said strips being positioned substantially perpendicularly to the direction in which the plate was rolled.

It is obvious that the process according to the invention presents no difficulties in carrying it out, since the stack of sheets may be bent without any precise adjustment of the bending machine being required. Bending of the stack of strips, for which the width of the strip at the bottom of the slot is important, is facilitated by the presence of the recesses formed in the straight edge of the strips. It has also been found that the channels constituted by the said recesses permits an efficacious cooling of the stator or rotor according to the invention by means of the circulation of air. The provision of slot bottoms having a depression therein is adapted to assure a flux path having a constant section despite the presence of the recesses and make it possible to obtain satisfactory electromagnetic characteristics with a smaller weight of metal which leads to a decrease in the cost of the stator or rotor.

When the angle of curvature α is large, that is to say, greater than 180°, the width of the strips at the bottoms of the slots must be relatively small in proportion to the radius of curvature measured at the bottom of the slot. When the angle α is equal to 360°, and for magnetic sheets of conventional ductility, good results are obtained when the ratio of the width of a strip at the bottom of a slot to the radius of curvature at the bottom of the slot is less than 1:8.

In order that the invention may be better understood, several embodiments thereof will now be described, purely by way of illustration and example, with reference to the accompanying drawings, in which.

Figure 1:
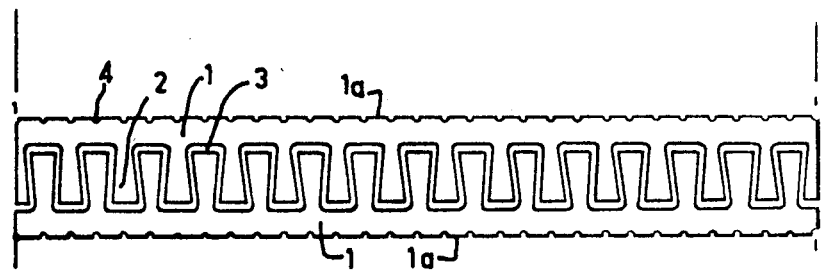
FIG. 1 is a plan view showing two straight strips cut from a rectangular sheet, for use in the manufacture of the stator of an alternator by bending them through an angle α of 360°.
Figure 2:
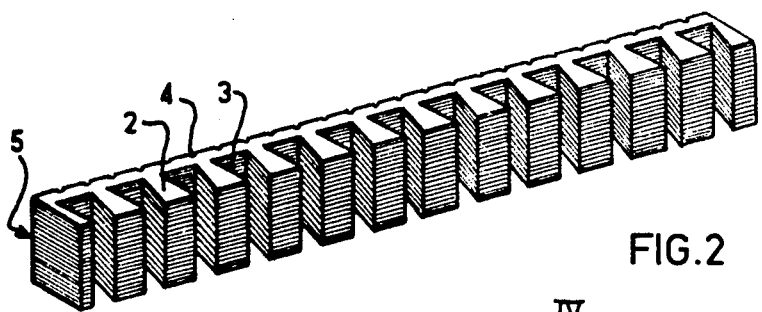
FIG. 2 is a perspective view of a stack of strips obtained by superposing strips like those of FIG. 1.

FIGS. 12A and 12B schematically illustrate the ends of the stator of FIG. 1 before and after their mechanical connection, when these ends are stapled together;

FIGS. 13A and 13B illustrate, before and after their mechanical connection, the connection of the ends of the stacks of curved plates by the interfitting of two teeth, the bearing surfaces of which are radial;

FIGS. 14A and 14B schematically represent the ends of the stack of curved strips before and after their mechanical connection, the connection being effected by the engagement of two teeth the bearing surfaces of which are oblique with respect to a radial plane passing through the teeth;

FIG. 15 schematically represents in elevation and during operation, the wheel of a machine adapted to bend a stack of strips analogous to the one shown in FIG. 2; the front cheek plate of said machine having been removed;

FIG. 16 schematically represents the stator of an alternator obtained by assembling two identical stacks of curved strips, the angle of curvature being 180°; and FIG. 17 is a perspective view showing the stator of an alternator produced by assembling three identical stacks of strips, each stack of strips having external channels which are semi-circular in section in alignment with each pole, the angle of curvature being 120°.

Referring now to the drawings, and more particularly to FIG. 1, it will be seen that reference numeral 1 indicates each of the two crenelated strips which have been cut from a single rectangular plate. Each strip 1 has a substantially straight edge 1a and a crenelated edge defining the pole-teeth 2 which are trapezoidal in shape and separated from each other by slots 3. The pole-teeth 2 of one of the strips are cut from the zones between the slots 3 of the other strip. Consequently, there is very little wasted material during cutting of the two strips 1 from a single rectangular plate. Along the substantially straight edge 1a, each strip 1 has recesses 4 which are semi-circular in shape and 2 mm in diameter. The centers of these recesses are positioned either axially of the pole-teeth 2 or axially of the slots 3. In the example described, the width of the strip at the bottom of the slots is 5 mm. The distance between the axes of two successive slots is 10 mm; the width of the strip 1 measured from the top of the pole-teeth 2 is 15 mm. The longer base of the trapezoid formed by each pole tooth 2 which is furthest from the bottom of the slot is 5 mm while the length of the shorter base of the trapezoid is 3 mm. The width of the sheet from which the two crenelated strips have been cut is 22 mm so that there exists a wastage of 2 mm resulting from cutting between the teeth of one strip 1 and the edges of the slots 3 of the other strip 1. FIG. 2 shows a stack of strips 1 having a thickness of 28 mm. The strips 1 are superposed so that all the pole-teeth 2 are in alignment with each other. This produces a stack of strips ready to be curved. The stack of strips has been designated by reference numeral 5. It comprises, throughout its length, 36 slots and its two ends are formed by half-teeth.

Figure 3:
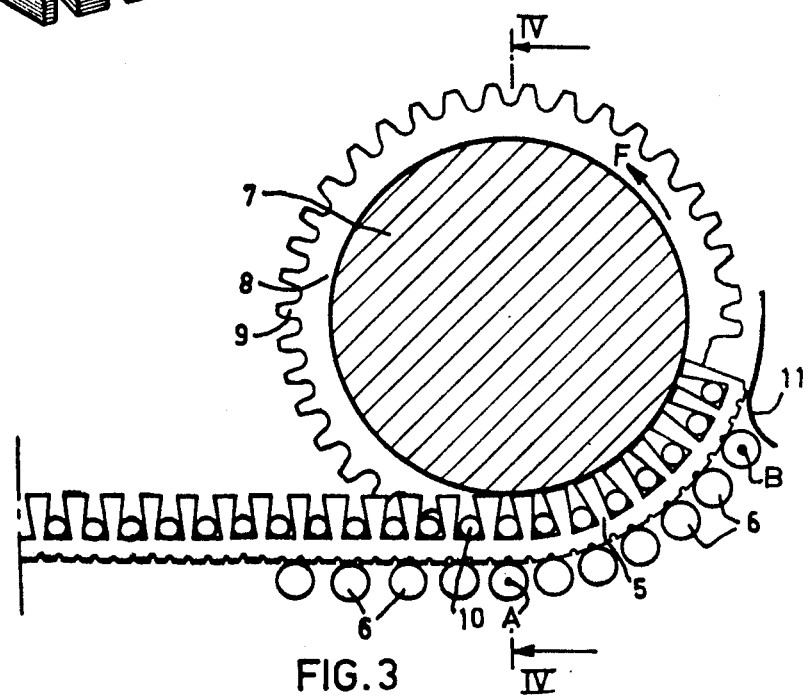
FIG. 3 is a schematic view showing, in elevation and during operation, the wheel of a machine adapted to bend a stack of strips such as shown in FIG. 2, the front cheek plate of said machine having been removed.
Figure 4:
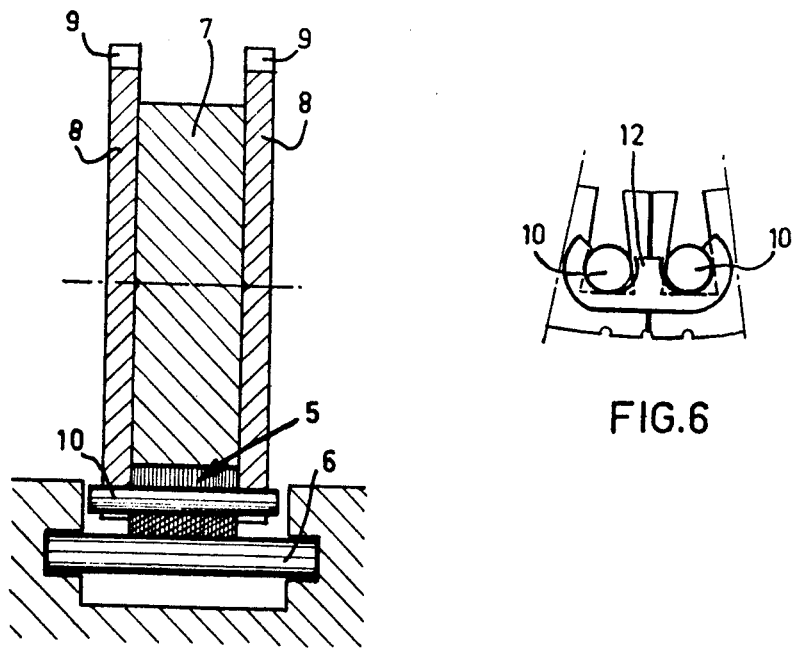
FIG. 4 is a sectional view taken along the line IV—IV of FIG. 3, showing the wheel with both of its lateral cheek plates.
Figure 5:
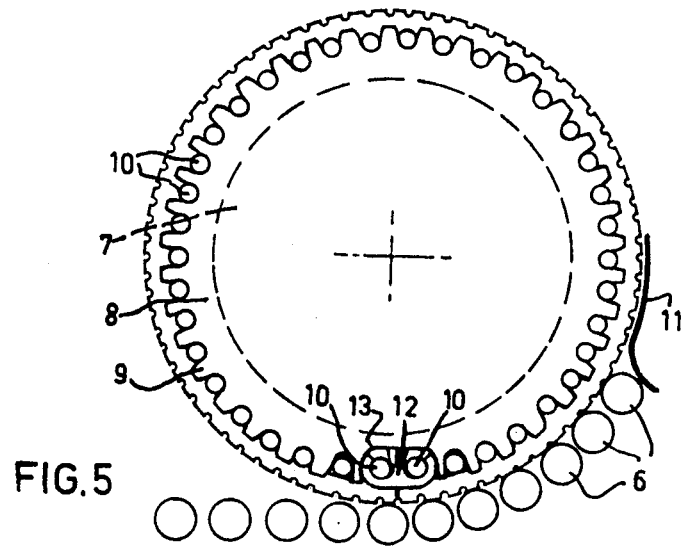
FIG. 5 shows the machine of FIG. 3 when the bending of the stack of strips has been completed.

FIGS. 3 to 5 show the operation of bending the stack of strips 5. The stack 5 is introduced to the inlet of a bending machine, which inlet is defined by means of rollers 6, the axes of these rollers 6 being parallel and defining one side of a path which comprises a flat zone at the left of the point A of FIG. 3 and a cylindrical zone having a part-circular section corresponding to the arc AB on FIG. 3. The rollers 6 serve, at the left of the point A, as supporting rollers and, in the zone corresponding to the arc AB, as bending rollers. The arc AB subtends an angle of between about 60° and 90°. Opposite the bending member constituted by the rollers 6 along the arc AB is a bending roll 7 fitted between two identical cheek plates 8, one of which is removable. Between the wheels 7 and the rollers 6 there are n intervals having a thickness (measured radially) of 15 mm. The peripheries of the cheek plates 8 have a succession of teeth, the radial axes of which are spaced by 10°. The height of the teeth 9 of the cheek plates 10 is 11 mm. The diameter of the cheek plates at the bottom of the teeth is 97 mm.

The stack of strips 5 is placed on the rollers 6 with the recesses 4 opposite the rollers 6. The distance between the axes of two successive rollers 6 is so selected that it is not a multiple of the distance between two successive recesses 4. A spindle 10 constituted by a cylindrical bar having a diameter of about 6 mm and a length of 5 mm is located in each of the slots 3 of the stack of strips 5 positioned on the supporting rollers 6. Preferably the end of the stack of strips 5 which is to be first introduced into the zone A of the bending machine is subjected to a preliminary bending operation in a press. The spindles 10 are positioned symmetrically with respect to the longitudinal plane of symmetry of the stack of strips 5. The stack of strips 5 provided with their spindles 10 is then brought toward the zone A of the bending machine shown on FIG. 3 and the wheel 7 is driven in the direction of the arrow F. Teeth 9 of the cheek plates 8 cooperate with the ends of the spindles 10 and consequently drive the stack 5 in the direction of the arrow F in the zone between the wheeels 7 and the rollers 6. This results in progressive bending of the stack of strips 5 around the wheel 7. The bending rollers 6 positioned along the arc AB are followed by a guide 11 which holds the stack of curved strips against the wheel 7 in the zone following the beginning of bending.

Figure 6:
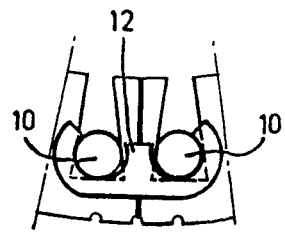
FIG. 6 is a detail view showing the connection of the two spindles in the two end slots of the stack of curved strips.

When the bending wheel 7 has rotated through 360°, the stack 5 has been bent into a cylindrical ring and the two ends of the stack 5 are opposite each other in alignment with the point A of the machine. As is illustrated in detail on FIGS. 5 and 6, the two spindles 10 positioned in the two end slots of the stack of strips 5 are connected together by means of two connectors 12 positioned on opposite sides of the two cheek plates 8, on the ends of the spindles 10. A recess 13 corresponding to the surface occupied by the connectors 12 is provided in the teeth of each of the two cheek plates 8. The recesses 13 thus amount to the elimination of the tooth 9 between the tooth spindle 10 in the end slots and the two adjacent teeth 9, or half of each of these two teeth 9.

Figure 7:
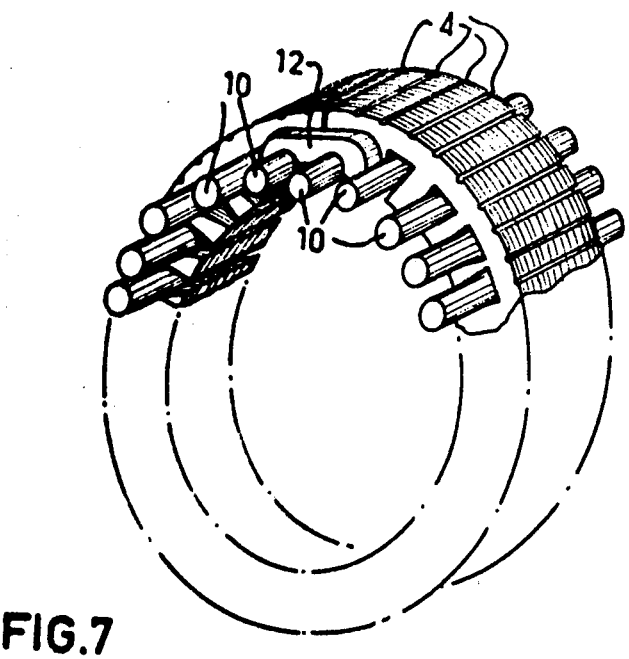
FIG. 7 is a partial perspective view showing the stator after it has been removed from the bending wheel of FIG. 5, with its spindles and the connectors for the end spindles.

The removable cheek plate 8 is then separated from the bending wheel 7 and the curved stack 5 is released from the support provided by the wheel 7. In the course of bending, the lateral sides of the slots 3 of the stack of strips 5 have borne against the spindles 10. The recesses 4 have served as preferential bending points so that the external border of the curved stack is a cylindrical surface having a polygonal base, the corners of the polygon being defined by the axes of the recesses 4. A stator formed in this manner is illustrated in FIG. 7. It is maintained at a radius of curvature corresponding to the one which was produced by the machine of FIGS. 3 and 4 by the presence of the connectors 12.

Figure 8:
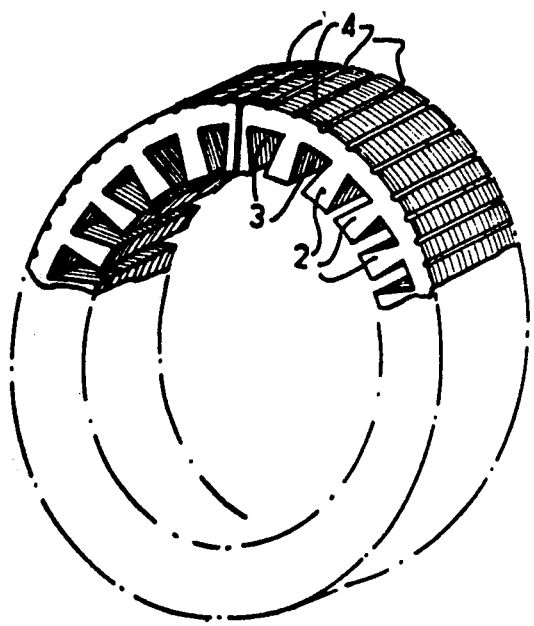
FIG. 8 shows the stator of FIG. 7 after welding of the connecting zone at its ends and removal of the spindles.

The ends of the curved stack 5 are opposite each other with a very small space separating the two ends. These two ends are then welded together while adding welding metal in order to obtain a welded stator such as shown in FIG. 8. After completion of the weld between the ends of the curved stack, the strips of the stack are also fastened together by supplemental welds along the outer sides of the curved stacks or by riveting. These connections are made in a conventional manner parallel to the axis of the stator. The spindles 10 are then withdrawn by removing them parallel to the axis of the stator, after having first removed the two connectors 12. This procedure results in a stator having 36 slots 3 with an axial thickness of 28 mm, an external diameter of 127 mm, an inner diameter of 97 mm, and a slot depth of 10 mm.

In a variation, the zone connecting the ends of the bent stacks may lie along the axis of a slot and in this case the connector 12 will cross three spindles 10.

It is obvious that the bending machine which has just been described is of simple construction and may be manufactured at a relatively low price. Its use involves no particular adjustment difficulties so that the use of the process according to the invention makes it possible to obtain alternator stators for automotive vehicles at low cost since the waste of cut-away material is small and shaping costs are limited.

Figure 9:
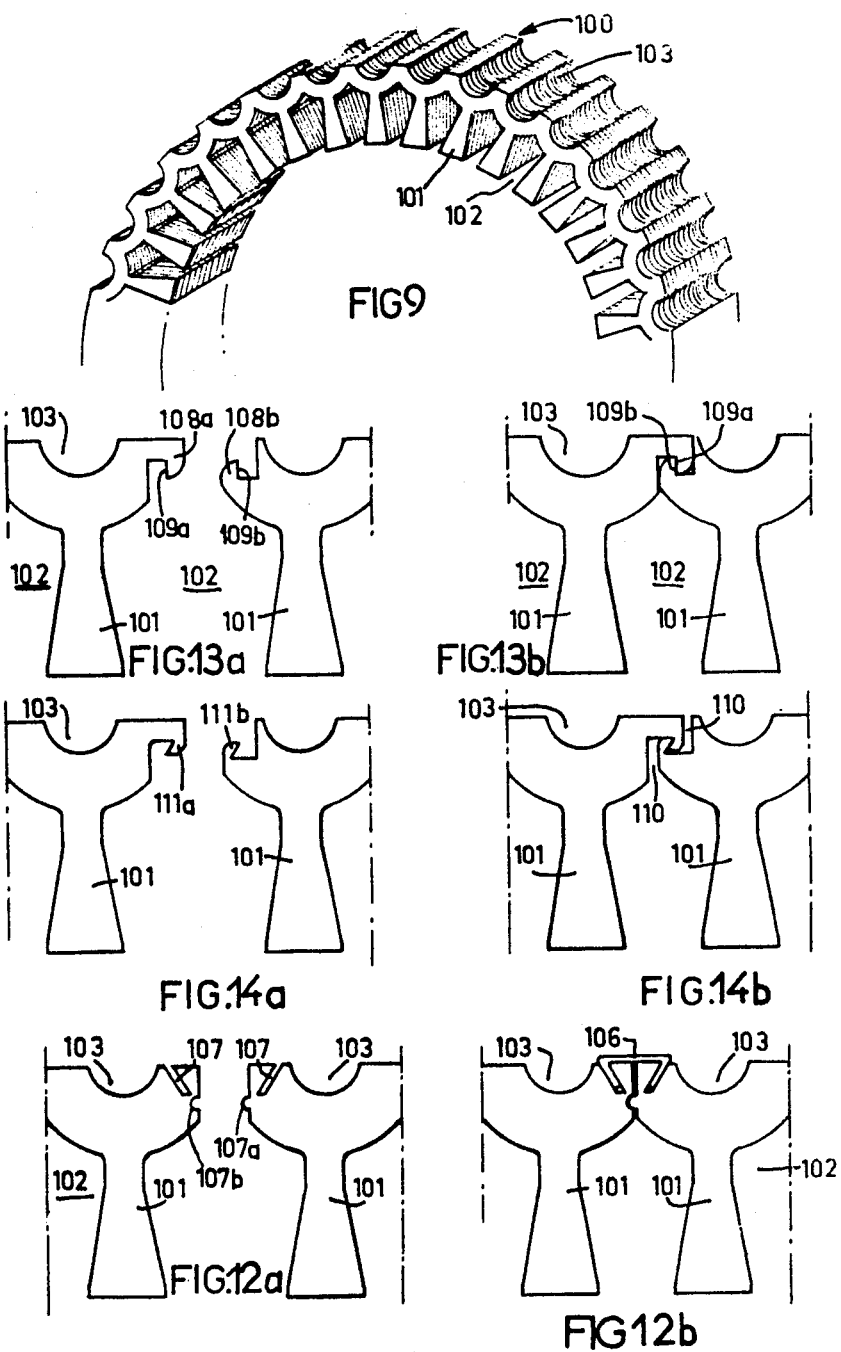
FIG. 9 is a partial perspective view showing the stator of an alternator according to another embodiment of the invention, which stator is also obtained by bending the strips through an angle of 360°.

Referring now to FIG. 9, it will be seen that reference numeral 100 indicates another stator according to the invention made by bending a stack of cut strips. The cut strips which have been bent to produce the stator 100 are welded to each other along the two generatrices of the outer slotless edge of the stack of strips before the bending operation and it will be noted that the bending operation may be carried out without any difficulty. This preliminary fastening together of the cut strips greatly facilitates the carrying out of the bending operation on the strips and consequently reduces its cost. When the bending operation has been completed, the curved stack is subjected to pressure parallel to the bending axis in order to eliminate any possible local deformations of the plates, in particular at the bottom of the slots which separate the pole teeth of the stator. This pressure also increases the compactness of the stack of curved strips.

The stator 100 carries pole teeth 101 which are separated from each other by slots 102. Near the bottom of the slot the pole tooth has a substantially constant section but in the part furthest from the bottom of the slot each pole tooth 101 is trapezoidal in section. In alignment with each pole tooth 101, the stator 100 comprises a channel 103 having a semi-circular section. The bottom of each slot 102 has a section defined by two circular arcs of the same radius, each having for its axis the axis of one of the two channels 103 which are adjacent to the slot 102 in question. These axes are positioned at the intersection of the radial plane of symmetry of a pole tooth 101 and the cylindrical surface which externally delimits the stator 100. It will be noted that the section through which the flux passes between two adjacent pole teeth 101 is substantially constant. Moreover, the channels 103 permit external cooling of the stator 100 by a flow of air driven by a ventilator associated with the alternator containing the stator 100.

Figure 10:
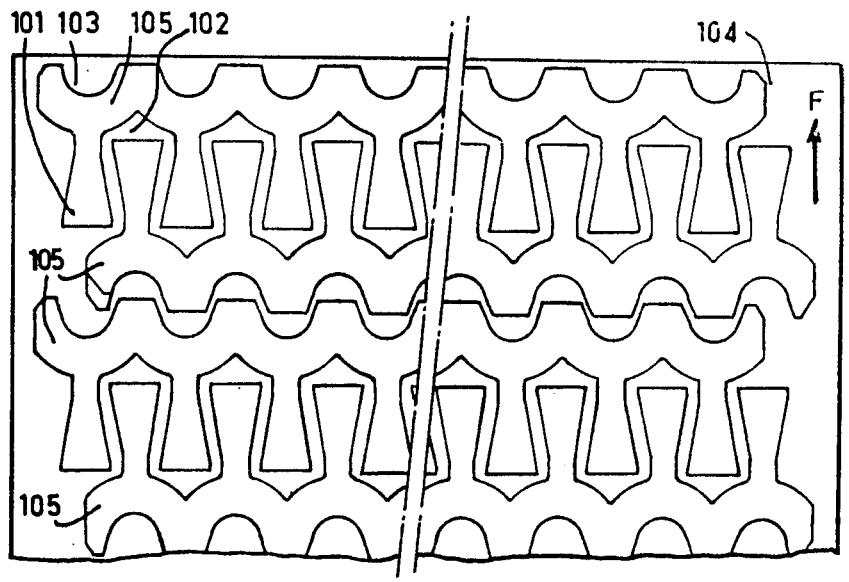
FIG. 10 is a plan view showing the cutting pattern adopted in order to obtain the strips for the stack of curved strips from which the stator of FIG. 9 is made.
Figure 11:
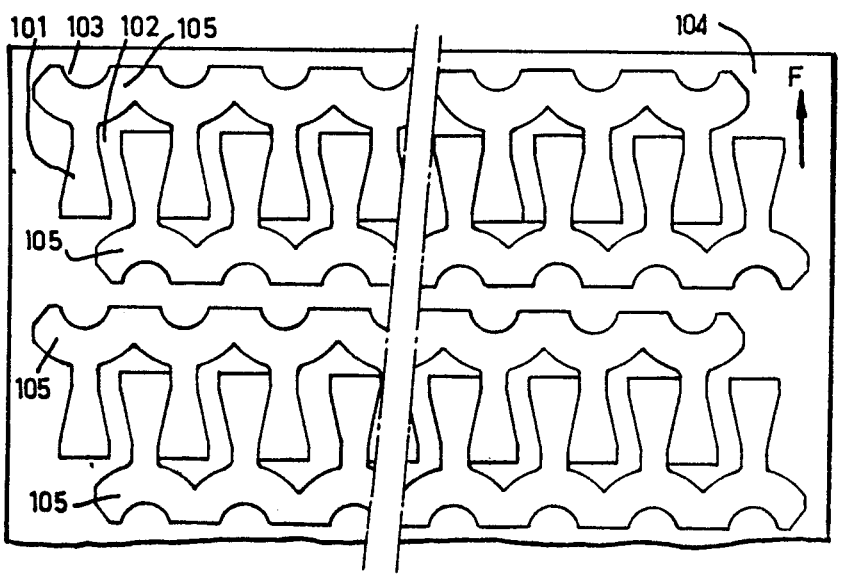
FIG. 11 is a plan view showing a variation of the cutting pattern shown on FIG. 10.

Referring now more particularly to FIGS. 10 and 11, it will be seen that the strips of a stack which constitute the stack of strips subjected to bending to produce the stator 100 are preferably cut from a sheet 104 produced by rolling in the direction of the arrow F. This rolling orients the fibers of the sheet in the direction of the arrow F. The cutting of the strips 105 takes place by positioning the longitudinal edges of the strips perpendicular to the direction of rolling defined by the arrow F. In this manner the fibers of metal are oriented in the direction of the pole teeth 101 which facilitates the subsequent bending. The cutting produces the recesses which form the channel 103 as well as the slots 102, two adjacent slots being separated by a pole tooth 101. In order to avoid waste of sheet material, it is preferred to cut the strips to be bent by positioning two strips 105 head to tail, so that the pole teeth of one fit into the slots of the other. This arrangement is clearly shown on FIGS. 10 and 11. On FIG. 10 it will be seen that the pole teeth 101 of one of the strips are positioned in the middle of the slot zones of the other strip and that the projections separating two adjacent recesses which form the ducts 103 enter the recesses forming the ducts 103 in the adjacent strip. On FIG. 11, to the contrary, the pole teeth of one of the strips are adjacent to the pole teeth of the other strip and in this case the end of each pole tooth has a constant width, the trapezoidal form being adapted only for the median zone of each pole tooth. This variation in cutting according to FIG. 11 does not correspond to the embodiment of FIG. 1 but has instead been described as an alternative arrangement.

On FIGS. 12A and 12B, the fastening together of the two ends of a stack of curved strips by means of a staple 106 has been schematically shown. On the ends of the strips of the curved stack, there is provided, at the time the strips are cut, slots 107 which are obliquely positioned. The staple 106 has a dovetailed section the arms of which enter into the oblique slots 107. At the ends of the cut strips a protuberance 107a has been provided on one side and a recess of corresponding shape 107b has been formed on the other side. These may cooperate as indicated on FIG. 12B to assure radial positioning the two ends with respect to each other when the bending is carried out. It will be seen that this method of mechanical fastening may be carried out quite easily by forcing together the two ends of the stack of curved strips and sliding the staple 106 into its seat.

FIGS. 13A and 13B show another method of mechanically fastening together the ends of a stack of curved strips. In this embodiment the ends of each strip are provided with teeth 108a, 108b, respectively, the teeth 108a and 108b having an identical shape and being positioned head to tail. The engagement of the two teeth 108a and 108b is effected by urging one of the bearing surfaces 109a and 109b respectively of these two teeth against each other. These bearing surfaces are parallel to the axes of the pole teeth 101 so that they lie, after bending the stack of strips, in a plane radial to the stator 100. In this embodiment, as in the foregoing, the two ends of the stack of curved strips may be brought together and held in contact with each other to the extent permitted by manufacturing tolerances.

In the embodiment illustrated on FIGS. 14A and 14B the mechanical connection is so effected as to permit a space 110 to exist between the two ends which have been fastened together after they have been connected. This result is obtained by using fastening teeth 111a and 111b analogous to the teeth 108a and 108b, but having bearing surfaces which are oblique with respect to the axes of adjacent pole teeth 101. This oblique position is selected so as to maintain the two teeth in engagement one against the other, once they have been engaged as shown in FIG. 14B.

It will be seen that the different mechanical fastening methods hereinbefore described make it possible to avoid any need for welding to hold the two ends of the stack of curved strips together. This step makes it possible to decrease the cost of the stator according to the invention. Moreover, the fact that channels 103 have been provided on the peripheral side of the stator 100 makes it possible to lighten the stator and the shape of the bottoms of the slots makes it possible to maintain a constant section for the path for the magnetic flux, the use in combination of these two characteristics making it possible, in the case of an alternator of given characteristics, to reduce the quantity of material required to manufacture the stator and consequently the cost of the stator. Moreover, the presence of the channels 103 makes it possible to insure peripheral ventilation of the stator and consequently better cooling.

FIG. 15 shows the bending of a stack of strips 5 through an angle α less than 360° (about 120° on the drawing). The members illustrated in FIG. 15 have been assigned the same reference numerals as those used for components in FIG. 3 which would correspond thereto if the angle α were 360°. The vertical diametral section through the bending wheel is the same as the one shown on FIG. 4.

The stack 5 is introduced into the inlet of a bending machine, this inlet being formed by rollers 6, the axes of the rollers 6 being all parallel and defining a surface which comprises a flat zone at the left of the point A on FIG. 15 and a cylindrical zone having a part-circular section corresponding to the arc AB on FIG. 15. The rollers 6 at the left of the point A serve as supporting rollers and, in the zone corresponding to the arc AB, they serve as bending rollers. The arc AB has a value between about 60° and 90°. Opposite the bending member constituted by the rollers 6 extending along the arc AB is a bending wheel 7 gripped between two identical cheek plates 8, one of which is removable. Between the wheel 7 and the rollers 6 is a space having a width (measured radially) of 15 mm. The edge of the cheek plates 8 has a series of teeth, the axes of which are spaced 10° apart. The height of the teeth 9 of cheek plates 8 is 11 mm and the diameter of the cheek plates at the bottom of the teeth is 97 mm.

The stack of strips 5 is placed on the rollers 6, the recesses 4 being positioned opposite the rollers 6. The distance between the axes of two successive rollers 6 is so selected that it is not a multiple of the distance between two successive recesses 4. A spindle 10 constituted by a cylindrical bar having a diameter of about 6 mm and a length of 50 mm is positioned in each of the slots 3 of the stack of strips 5 located on the supporting rollers 6. Preferably the end of the stack of strips 5 which is to be first introduced into the zone A of the bending machine is subjected to a prebending step in a press. The spindles 10 are symmetrically positioned with respect to the longitudinal plane of symmetry of the stack of strips 5. The stack of strips 5 provided with its spindles 10 is then brought into the zone A of the bending machine illustrated on FIG. 3 and the wheel 7 is driven in the direction of the arrow F. The teeth 9 of the cheek plates 8 cooperate with the ends of the spindle 10 to consequently drive the stack 5 in the direction of the arrow F in the zone between the wheel 7 and the rollers 6. This produces a progressive bending of the stack of strips 5 around the wheel 7. The bending rollers 6 positioned along the arc AB are followed by a guide 11 which holds the stack of bent strips 5 against the wheel 7 in the zone following the beginning of bending.

When the bending wheel 7 has completed its rotation through an angle α, the stack 5 has, as a whole, assumed the shape of a cylindrical circular sector having a dihedral angle of the value α. If the angle α is relatively small it is possible to remove the bent stack without removing one of the cheek plates of the centering wheel. On the contrary, if the angle α is relatively large, it is necessary to remove one of the cheek plates of the centering wheel in order to extract the bent stack. In the course of bending, the lateral sides of the slots 3 of the stack of strips 5 bear against the spindles 10. The recesses 4 have served as preferential bending points so that the external surface of the bent stack is a cylindrical surface having a polygonal base with the corners of the polygon constituted by the axes of the recesses 4.

The bent stack obtained in this way is assembled together with at least one other bent stack to form a cylindrical ring having a dihedral angle of 360°. FIG. 16 schematically shows the construction of an alternator stator for an automotive vehicle from two identical curved stacks each extending over a dihedral angle of 180°. The two curved stacks have been indicated by reference numeral 20. They are assembled by means of two identical staples 21 located in the two connecting zones on the outside of the stator. The two staples 21 have a dove-tailed section and their arms are engaged in grooves formed in the stator, said grooves having been cut into the ends of the strips destined to constitute the curved stacks 20.

FIG. 17 shows another embodiment of the stator of the alternator according to the invention. In this embodiment the stator consists of three identical curved stacks 25 each extending over a dihedral angle of 120°. The outer wall of the stator made in this manner comprises channels 26 parallel to the axis of the stator and having a semi-circular section, the radius of these semi-circles being 4 mm. A channel 26 is in alignment with each of the pole teeth 27 of each curved stack. The bottom of the slots which separate two successive pole teeth 27 has a right section consisting of two circular arcs the axes of which are the axes of the two channels 26 adjacent to the slot in question. The assembly of the three curved stacks has not been shown in detail in this embodiment, since it may be carried out by stapling as in the case of FIG. 16 or by mechanical interfitting, or by welding. It has been found that the stator illustrated on FIG. 17 is lighter than a stator of the conventional type by reason of the presence of channels 26. These channels also permit effective cooling of the stator by the circulation of air therethrough. It has also been found that the electro-magnetic efficiency of the stator is not adversely affected by the small air gaps which may exist between the ends of the curved stacks 25 when they have been assembled together.

It will, of course, be appreciated that the embodiments which have just been described have been given purely by way of illustration and example and may be modified as to detail without thereby departing from the basic principles of the invention.

What is claimed is:

1. A method of manufacturing a curved magnetic circuit assembly comprising the steps of forming a plurality of flat identical strips defined by two edges having substantially parallel median lines one of said edges of each strip having a plurality of teeth defining slots between the teeth, stacking said strips to form a stack in which the slots are aligned with each other, introducing spindles into said slots in said stack of strips, arcuately bending said stack in a circular former to form a curved magnetic circuit assembly having aligned teeth and slots; wherein said step of introducing spindles comprises introducing spindles into said slots having a length greater than the thickness of the stack of strip; and said step of bending comprises driving said spindles to bend said stack in the circular former.

2. A method according to claim 1 wherein the step of introducing spindles comprises introducing spindles having a diameter equal to the diameter of a circle which, in any slot in said annular member, is tangent to the bottom of the slot and to the two lateral sides defining said slot.

3. A method according to claim 1 in which said driving of said spindles to bend the stack comprises providing a wheel having a diameter equal to the inside diameter of the annular member to be formed, positioning said wheel between two toothed essentially identical cheek plates having spindle engaging openings of a pitch approximately equal to the pitch of the slots of the stack, providing a series of rollers in spaced opposed relation to said wheel, and passing the stack of strips between the wheel and the rollers to bend the stack.

4. A method according to claim 3 wherein the method further comprises the step of fastening the spindles in the two end slots of the body together by positioning at least one connector on at least one of the ends of said spindles, and removing said cheekplates from said stack after fastening said spindles together.

5. A method of manufacturing a curved magnetic circuit assembly comprising the steps of cutting from a substantially flat sheet substantially identical strips defined by two edges having substantially parallel and straight median lines, forming one edge of said strips into a succession of slots constituting a crenelation and defining pole teeth therebetween, stacking said strips so that the median lines of corresponding edges are superposed and the teeth are aligned to produce a stack of toothed strips having the thickness desired for the member to be manufactured, cold bending said stack by engaging edges of said strips with driving elements of a circular former, while maintaining said pole teeth aligned, into a circular sector subtending an angle of 360° and having ends, and connecting the ends of said stacked curved strips together to form the annular member of a magnetic circuit having a regular succession of aligned slots and pole teeth.

6. A method according to claim 5 which further comprises the step of fastening the strips of the stack to each other before bending said stack into a circular sector by welding the non-toothed edge of the stack of strips along spaced lines parallel to the height of the stack.

7. A method according to claim 5 which further comprises the step of forming recesses on the edge of said strips opposite the edge having the succession of slots.

8. The method according to claim 5 which further comprises securing the ends of the stacked curved strips to each other by welding.

9. The method according to claim 5 which further comprises mechanical interlocking the ends of the stacked strips to each other.

10. A method according to claim 5 which further comprises compressing the stack of strips in a direction parallel to the bending axis, after to bending.

11. A method according to claim 5 wherein said step of cutting strips comprises cutting said strips from a metal plate previously rolled to obtain a predetermined direction of grain orientation, and forming said teeth to extend parallel to the direction of grain orientation.

12. A method according to claim 5 wherein the ratio of the width of each strip measured from the bottom of the slots to the radius of curvature at the bottom of the slots is less than 1:8.

13. A method according to claim 5 which further comprises forming plural reccesses on the tooth free edge of each of the strips, spaced apart the same distance as said teeth, and said step of bending the stack into a circular sector includes bending the stack to form a polygon wall along the side with the recesses, whereby the edges of the polygon are parallel with the axes of the recesses.

14. The method of claim 13 wherein the step of forming recesses comprises forming semi-circular recesses.

15. The method of claim 13 wherein said step of forming recesses comprises forming curved recesses, and said step of forming said slots further comprises, forming slots with surfaces curving about the axes of adjacent recesses.

16. The method according to claim 5 which further comprises holding the ends of the stack of strips together in an outer jacket.

17. A method of manufacturing a curved toothed magnetic circuit assembly comprising the steps of cutting from a substantially flat sheet substantially identical strips defined by two edges having substantially parallel and straight median lines, forming one edge of said strips into a succession of slots constituting a crenelation and defining pole teeth therebetween, stacking said strips so that the median lines of corresponding edges are superposed and the teeth are aligned to produce a toothed stack of strips having the thickness desired for the member to be manufactured, bending said stack by engaging said edges of said stack between opposed bending elements of a circular former, while maintaining said pole teeth aligned, into a first circular sector subtending an angle $\alpha$ less than 360° and having ends, bending at least one other stack of strips having teeth and slots into a second circular sector having a radius approximately equal to that of said first sector and subtending an angle not greater than 360° less $\alpha$ and having ends, and connecting the ends of said stacked curved strips together to form the annular member of a magnetic circuit having a regular succession of aligned slots and pole teeth.

18. The method according to claim 17 which further comprises establishing $n$ substantially radial assembly zones and positioning in each zone adjacent ends of at least one out of $n$ of the sectors to define a complete cylinder forming the annular member, $n$ being a whole number equal to or greater than 1.

19. The method according to claim 18 wherein said step of connecting the ends of the curved sectors together comprises welding the sectors together.

20. The method of claim 18 which further comprises forming depressions in the bottoms of the slots of the strips in their central zones.

21. The method of claim 18 which further comprises fastening the strips of a stack to each other parallel to the rows of teeth.

22. The method of claim 20 wherein the step of forming recesses comprises forming the recesses in the radial median planes of the slots of each strip of the stack of strips.

* * * * *